United States Patent Office 3,512,935
Patented May 19, 1970

3,512,935
METHOD FOR PRODUCING NONSTAINING FURNACE CARBON BLACK
Andries Voet and Charles Ronald Price, Borger, Tex., assignors to J. M. Huber Corporation, Locust, N.J., a corporation of New Jersey
No Drawing. Filed July 31, 1967, Ser. No. 657,079
Int. Cl. C01b *31/32*
U.S. Cl. 23—209.9                                    5 Claims

ABSTRACT OF THE DISCLOSURE

A method of eliminating color bodies from furnace carbon black by oxidation. The black is mixed with an aqueous solution containing from 0.125 to 0.75 weight percent of ammonium nitrate based on the weight of the carbon black followed by heating the mixture through from 150° C. to 300° C. for from 10 minutes to 12 hours so that the carbon black itself is substantially unoxidized.

BACKGROUND OF THE INVENTION

*Field of the invention.*—The present invention relates to the production of carbon black particularly for use in rubber and a removal of color bodies from the carbon black after manufacture which if left in the black would create staining conditions in the finished rubber.

*Description of the prior art.*—Furnace carbon black is produced by pyrolysis of normally gaseous or of vaporized normally liquid hydrocarbons or of mixtures thereof. Commonly, feedstock is used largely composed of high boiling aromatic fractions, which are residues of the cracking of petroleum to produce motor fuels. A gaseous raw material for the production of furnace black commonly used is natural gas.

Much of the carbon black produced is used as a reinforcing agent in rubber compounds. Occasionally carbon black filled rubber compounds are used in contact with other rubber compounds filled with different pigments, particularly with white pigments, such as for instance in the case of white sidewall tires and in many other rubber compositions. It has been observed that frequently a migrating rubber soluble colorant would enter the white or light colored rubber composition from the adjacent carbon black-filled rubber, resulting in a highly undesirable staining effect.

It has long been established that one source of the staining is frequently in the carbon black used as a filler in the black rubber composition. A test had been devised whereby a carbon black is extracted with a solvent such as benzene and the color of the benzene measured by means of a colorimeter. Such a test now in general use is described in ASTM Test D1618–58T, accepted by the Administrative Committee on Standards of the American Society for Testing Materials and published in the ASTM Standards on Carbon Blacks issued in November 1961. In this test the percent transmittance of an extract in benzene is determined. Values of 85% or more transmittance are indicative of a practically nonstaining black. Values below 50% transmittance generally lead to a black with pronounced staining characteristics.

Many carbon blacks, particularly those with a larger particle size, are produced in a pyrolysis process whereby highly colored chemicals are formed which are strongly adsorbed by the surface of the particle. Upon incorporation in a rubber compound, however, these colored materials are gradually dissolved by the rubber matrix and migrate freely into adjacent light colored rubber compounds, causing the highly objectionable staining often observed.

SUMMARY

We have discovered, and it is upon this discovery that our invention is predicated, that the staining colorants can be removed by oxidation with a dilute solution of ammonium nitrate without otherwise affecting the carbon black.

The use of dilute solutions of ammonium nitrate as an oxidant for the color bodies attached to the carbon particles is extremely effective. The dosage of the oxidant is easily achieved by dissolving the salt into the water of pelletization in the desired quantity. In the pelletization process, water and carbon black are used in approximately equal quantities. This water is intimately mixed with the black by means of pin mixers or similar mixing equipment. By using a dilute solution of ammonium nitrate instead of water in the pelletization process, a thorough mixing of black and oxidant is obtained.

The pellets are dried under elevated temperatures in a conventional manner with the oxidant decomposing into gaseous products, without increasing the ash content of the carbon black. The temperatures of drying are in a range from 150° C. to 300° C. and the time of drying will be in a range of from 10 minutes to 12 hours. Thus, the oxidation process could be achieved during the pelletization steps in the manufacture of the carbon black.

If desired, however, oxidation of the color bodies of the carbon black could be done in a separate process, either in the fluffy form or in the pelletized form of the carbon black.

Treatment of carbon black with oxidants generally leads to the oxidation of the carbon black itself. Thus, gaseous oxidants such as air, ozone, oxygen, nitrogen dioxide, nitric acid, even in low concentrations, cause an undesirable furnace carbon black oxidation. Such oxidation is characterized by an increase in oxygen content and a decrease in pH or even a change from an alkaline to an acid pH, as measured by the method of ASTM D–1512. In addition, such oxidants, as a rule, will also create a substantial amount of destructive oxidation of carbon black characterized by a reduction in yield and formation of carbon dioxide and carbon monoxide.

The oxidant of our invention, ammonium nitrate, was found to be ineffective as an oxidant for furnace carbon blacks in concentrations below 0.75 percent of the black. Yet, it was found that it was effective as an oxidant for the color bodies of carbon black in concentrations as low as 0.125 percent of the black.

DESCRIPTION OF THE PREFERRED EMBODIMENTS

The invention may be further illustrated by the following examples.

Example 1

As a control 1000 grams of an unpelletized semireinforcing furnace black (SRF) of a surface area of 24 m.$^2$/g. was pelletized in conventional laboratory pelletizing equipment with 1 liter of water. The pellets were dried for 3 hours at 230° C.

Example 2

1000 grams of the unpelletized SRF of Example 1 were pelletized with 1 liter of water containing 1.25 grams of ammonium nitrate in conventional pelletizing equipment. The pellets were dried for 3 hours at 230° C.

Example 3

Example 2 was repeated, except that the concentration of ammonium nitrate was increased to 2.5 grams.

Example 4

Example 2 was repeated except that the concentration of ammonium nitrate was increased to 5.0 grams.

Table I indicates the properties of the SRF blacks of Examples 1 through 4.

TABLE I

| Example | 1 | 2 | 3 | 4 |
|---|---|---|---|---|
| Conc. NH₄NO₃, wt. percent | 1 | 0.125 | 0.25 | 0.50 |
| Light transmittance, percent ASTM D1618-58T | 44 | 76 | 85 | 89 |
| Oxygen content, percent | 0.29 | 0.29 | 0.31 | 0.32 |
| pH (ASTM D-1512) | 8.9 | 8.9 | 8.8 | 8.1 |

Example 5

The test of Example 1 was repeated, but instead of the SRF black, a general purpose furnace black (GPF) of a surface area of 33 m.²/g. was used.

Example 6

The test of Example 3 was repeated but instead of the SRF black, the GPF of Example 5 was used.

Example 7

The test of Example 6 was repeated except that the concentration of ammonium nitrate was increased to 5.0 grams.

Example 8

The test of Example 6 was repeated except that the concentration of ammonium nitrate was increased to 7.5 grams.

Table II indicates the properties of the GPF blacks of Examples 5 through 8.

TABLE II

| Example | 5 | 6 | 7 | 8 |
|---|---|---|---|---|
| Conc. NH₄NO₃, wt. percent | 0 | 0.25 | 0.50 | 0.75 |
| Light transmittance, percent ASTM D1618-58T | 35 | 80 | 88 | 91 |
| Oxygen content, percent | 0.45 | 0.45 | 0.47 | 0.52 |
| pH (ASTM D-1512) | 8.8 | 8.8 | 8.6 | 8.0 |

Example 9

A quantity of 100 grams of a high abrasion furnace black (HAF) of a surface area of 81 m.²/g. and a pH of 8.8 (ASTM D-1512) was mixed with 200 ml. distilled water and 0.5 grams of ammonium nitrate. The mixture was dried in an oven at 190° C. for 4 hours. The pH was reduced to 8.0. The transmittance (ASTM D1618-58T) was changed from 75 to 94. Th oxygen content was changed from 0.62 to 0.66 percent.

Quantities higher than 0.75 percent of ammonium nitrate may lead to oxidation of black and to undesirable products, as may be seen from Example 10 below.

Example 10

The Example 9 was repeated, but instead of 0.5 gram of ammonium nitrate, a quantity of 1.5 gram was used. The transmittance was changed to 98, but the pH was reduced to 6.2 and the oxygen content increased from 0.62 to 1.22. The carbon black of this example was not suitable as a reinforcing filler in view of the greatly reduced rate of curing of vulcanizates made with this oxidized carbon black.

The method can also be carried out by dry mixing the carbon black and ammonium nitrate prior to application of the pelletizing water.

We claim:

1. The process of oxidative elimination of the color bodies from an alkaline furnace carbon black to produce a nonstaining carbon black in which the carbon black particles remain in a substantially unoxidized form comprising the steps of:
    (a) mixing the carbon black with an aqueous solution containing from 0.125% to 0.75% by weight of ammonium nitrate based on the carbon black,
    (b) followed by heating the mixture to about 150° C. to 300° C. for a period of time from 10 minutes to 12 hours,
    (c) recovering a nonstaining carbon black having at least 76% transmittance as determined by the color of benzene measured by a colorimeter in accord with ASTM Test D1618-58T and having the carbon black particles therein in a substantially unoxidized form.

2. The method as claimed in claim 1 wherein the temperature of heating is about 240° C. and the time of heating is about 3 hours.

3. The method as claimed in claim 1 wherein the carbon black is a semi-reinforcing furnace black (SRF) and the oxygen content of said recovered carbon black is less than 0.32%.

4. The method as claimed in claim 1 wherein the carbon black is a general purpose furnace black (GPF) and the oxygen content of said recovered carbon black is less than 0.52%.

5. The method as claimed in claim 1 wherein the carbon black is a high abrasion furnace black (HAF) and the oxygen content of said recovered carbon black is less than 0.66%.

References Cited

UNITED STATES PATENTS

| 2,641,533 | 6/1953 | Cines et al. | 23—209.1 |
| 2,682,448 | 6/1954 | Cines | 23—209.1 |
| 2,686,107 | 8/1954 | Jordan | 23—209.1 |
| 3,306,761 | 2/1967 | Johnson | 106—307 |

EDWARD J. MEROS, Primary Examiner

U.S. Cl. X.R.

23—209.2

UNITED STATES PATENT OFFICE
CERTIFICATE OF CORRECTION

Patent No. 3,512,935　　　　　　　　Dated May 19, 1970

Inventor(s) Andries Voet and Charles Ronald Price

It is certified that error appears in the above-identified patent and that said Letters Patent are hereby corrected as shown below:

At Column 3, Line 9, the entry in Table I for the amount of "Conc. $NH_4NO_3$, wt. percent ..." under Example 1, reading "1", should read -- 0 --.

Column 3, lines 6-9 should appear as follows:

TABLE I

| Example | 1 | 2 | 3 | 4 |
|---|---|---|---|---|
| Conc. $NH_4NO_3$, wt. percent | 0 | 0.125 | 0.25 | 0.50 |

SIGNED AND SEALED
SEP 22 1970

(SEAL)
Attest:

Edward M. Fletcher, Jr.
Attesting Officer

WILLIAM E. SCHUYLER, JR.
Commissioner of Patents